Aug. 21, 1962     J. D. SCIOLORO     3,050,223
HOLDER FOR SECURING RECEPTACLES TO THE FLOOR OF A VEHICLE
Filed April 8, 1959
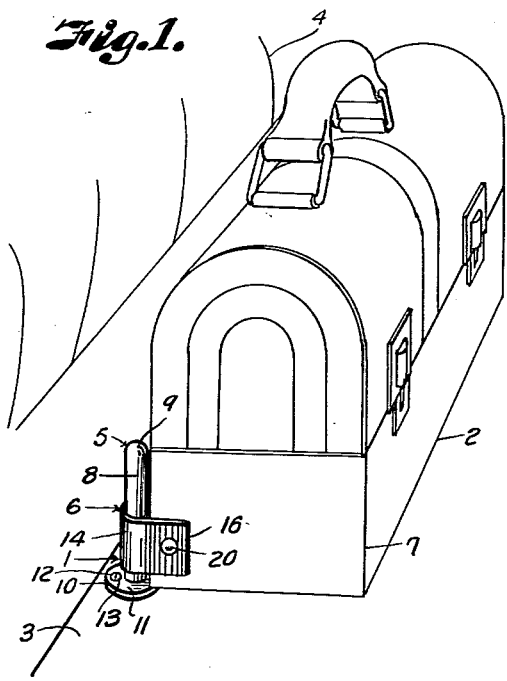
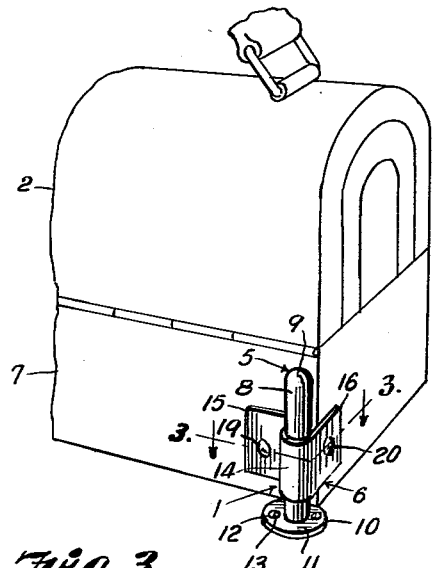
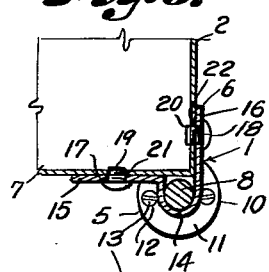
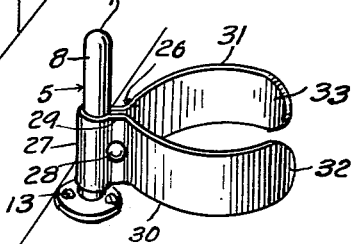
INVENTOR.
Joseph Dudley Scioloro
BY
Paul E. Mullendore
ATTORNEY United States Patent Office 3,050,223
Patented Aug. 21, 1962

3,050,223
HOLDER FOR SECURING RECEPTACLES TO THE FLOOR OF A VEHICLE
Joseph Dudley Scioloro, 14620 Rath St., La Puente, Calif.
Filed Apr. 8, 1959, Ser. No. 804,978
3 Claims. (Cl. 224—29)

This invention relates to a holder for receptacles, such as lunch boxes, thermos bottles, and the like, when carried in a vehicle.

Such receptacles are usually placed upon the floor or seat of a vehicle, and the motion of the vehicle causes them to slide from side to side or overturn, so that the contents spill, or in some instances a loose receptacle may distract the driver's attention and interfere with safe operation of the vehicle.

It is, therefore, an object of the invention to provide a simple and inexpensive holder that may be attached to the floor of the vehicle in an out of way place, so that the holder does not become a hazard to persons upon entering or leaving the vehicle or when they are riding therein.

A further object of the invention is to provide a holder to which the receptacle is easily attached and removed therefrom.

In accomplishing these and other objects of the invention, I have provided improved structure, the preferred forms of which are illustrated in the accompanying drawings wherein:

FIG. 1 is a perspective view of a holder constructed in accordance with the present invention and showing a lunch box held thereby on the floor at the front of a seat in a vehicle.

FIG. 2 is a similar view from the opposite side, to better illustrate the part of the holder that is attached to the lunch box.

FIG. 3 is a horizontal section on the line 3—3 of FIG. 2.

FIG. 4 is a perspective view of a modified form of holder, particularly adapted for retaining a Thermos bottle in an upright position.

FIG. 5 is a similar view of the modified form of holder, showing the Thermos bottle removed from the holder.

Referring more in detail to the drawings, and first to the form illustrated in FIGS. 1 and 2:

1 designates a holder particularly adapted for holding a lunch box 2 on the floor 3 of a vehicle immediately in front of the seat 4, as shown in FIG. 1. The holder 1 includes a fixed part or standard 5 and a removable part 6 which is adapted to be connected with the wall 7 of the lunch box 2, as later to be described. The fixed part 5 comprises a vertical rod or standard 8 preferably of circular cross section and has a continuous smooth exterior surface extending upwardly from a base 10 and terminating in a rounded end 9 as shown. The standard 8 has a height less than the overall height of the lunch box 2, whereby when the lunch box is placed on the floor 3, the removable part 6 of the holder may be passed freely over the upper end 9 and moved downwardly thereof as the lunch box comes into contact with the floor of the vehicle. The base or foot portion 10 comprising a plate 11 to which the standard or rod 8 is suitably attached, as by staking, welding, threading, or the like. The plate 11 has openings 12 to pass fastening devices such as screws 13 to secure the standard 5 to the floor of the vehicle in the place desired.

The removable part or loop member 6 of the holder includes a loop portion 14 terminating in laterally extending ears 15 and 16 which are arranged at right angles to each other to embrace the corner of the lunch box. The ear portions 15 and 16 have apertures 17 and 18 for fastening devices such as rivets or screws 19 and 20 that are projected through openings 21 in the wall portion of the lunch box, as best shown in FIG. 2. The loop portion 14 is of a size to pass over the upper end of the rod portion of the standard, as shown in FIG. 2.

In installing the holder, the foot portion 10 of the holder is placed, for example, upon the floor 3, preferably alongside the front of the seat 4 in substantially close relation thereto, preferably allowing only sufficient space with respect to the front of the seat to pass the loop portion 14 of the removale part of the holder over the rod portion 8 of the standard. After locating the standard, the floor is drilled in registry with the openings 12 in the plate 11, to pass threaded shank portions of the screws 13 thereinto. Self tapping screws may be used to draw the heads thereof into contact with the plate 11, and the plate 11 into firm contact with the floor 3. After attachment of the fixed part 5, the removable part 6 is applied to a corner of the lunch box, as shown in FIGS. 1, 2 and 3, and self tapping screws 19 and 20 are applied through the openings 17 and 18 in the ears and threaded into the openings 21 in the wall of the lunch box 2, as shown in FIG. 3. It is obvious that the removable part 6, when attached to the lunch box 2, is of such small size that it does not interfere with use of the lunch box, and that the fixed part 5 is so located that it is out of the way and does not cause a hazard to the occupants of the vehicle, either when getting into and out of the vehicle or when riding therein. It is also obvious that when the part 5 is in place and the loop portion 14 of the part 6 of the holder attached to the lunch box 2, the loop portion 14 passes quickly and freely over the rounded end 9 of the rod portion 8 of the standard as the lunch box is placed in front of the seat and upon the floor of the vehicle. The loop member turns of swings about the standard as the lunch box is moved closer to the seat.

While I have illustrated the holder as being located in front of the seat 4, it may be secured along an inner side wall of the vehicle, in front of the dash, or in other convenient positions where the standard is protected while allowing the removable part of the holder to pass freely thereover when the lunch box is to be carried in the vehicle.

The form of invention shown in FIGS. 4 and 5 is particularly adapted for securing a Thermos bottle 25 or the like in upright position. The fixed part of the holder is identical with the corresponding part of the holder shown in FIGS. 1 and 2, but the removable part 26 which is attached to the Thermos bottle is of a shape to conform therewith. In this instance, the removable part of the holder is formed of a strip of preferably flat resilient material formed midway the length thereof to provide a loop 27 therein. The loop is closed by a fastening device such as a screw or rivet 28 by which portions of the strip are brought together as at 29 to retain the form of the loop, as shown in FIGS. 4 and 5. The ends 30 and 31 of the strip are shaped to form arcuate clamp portions 32 and 33 adapted to clamp upon the wall of the Thermos bottle 25 for attachment thereto.

In this form of the invention, the fastening device 28 may be drawn sufficiently tight to clamp the loop portion 27 to the rod portion 8 of the standard, so that the clamp may be retained on the rod portion when the Thermos bottle is applied and removed.

From the foregoing, it is obvious that I have provided a holder for receptacles such as lunch boxes, Thermos bottles, and the like, that is of simple and inexpensive construction and which effectively secures such receptacles from sliding unrestrictedly about or overturning on the floor of a vehicle.

What I claim and desire to secure by Letters Patent is:
1. In combination with a motor vehicle having a seat and a floor extending from the seat, a container, and a holder for preventing the container from tipping over and sliding unrestrictedly about the floor of said motor vehicle, said holder including a base, a standard fixed to and extending upwardly of the base and having a smooth exterior surface terminating above the base in a rounded end, means for securing the base to the floor of the vehicle, near said seat, and a loop member having an axial passage to slide freely over the rounded end of the standard and having laterally extending ears embracing a part of said container whereby said loop member is attached to the container to be carried thereby, said axial passageway of the loop member being adapted to be registered with the rounded end of the standard and to pass the standard therethrough as the container is placed upon the floor of the vehicle and said loop member being adapted to swing about the standard to move the container into an out of way position against said seat of the vehicle.

2. A holder in combination with a container as described in claim 1, wherein the ears of the loop member are of spring material and grip the container therebetween.

3. In combination with a motor vehicle having a seat and a floor extending from the seat, a lunch box, and a holder for preventing the lunch box from tipping over and sliding unrestrictedly about the floor of said motor vehicle, said holder including a base fixed to said floor near the seat, a standard fixed to and extending upwardly of the base and having a smooth exterior surface terminating above the base in a rounded end, a loop member having an axial passage to slide freely over the rounded end of the standard and having lateral ears extending at right angles to each other and engaging adjacent side walls of the lunch box at a corner thereof, and fastening devices extending through said ears and walls of the lunch box for securing said loop member to the corner of the lunch box to be carried thereby, said axial passageway of the loop member being adapted to be registered with the rounded end of the standard and to pass the standard therethrough as the lunch box is placed on the floor of the vehicle, and said loop member being adapted to swing about the standard as the lunch box is shifted to an out of way position on said floor and against said seat of the vehicle.

References Cited in the file of this patent
UNITED STATES PATENTS

| | | |
|---|---|---|
| 432,305 | Foley | July 15, 1890 |
| 836,555 | Birnie | Nov. 20, 1906 |
| 1,001,535 | Kamp | Aug. 22, 1911 |
| 1,233,823 | Tiger | July 17, 1917 |
| 1,739,354 | Evans | Dec. 10, 1929 |
| 1,769,430 | Henke | July 1, 1930 |
| 1,936,664 | Fransosi | Nov. 28, 1933 |
| 2,326,481 | Meyer | Aug. 10, 1943 |
| 2,505,840 | Shonnard | May 2, 1950 |
| 2,708,062 | Poyer | May 10, 1955 |
| 2,862,991 | Reardon | May 2, 1958 |